United States Patent [19]

Flaugher et al.

[11] Patent Number: 4,934,514
[45] Date of Patent: Jun. 19, 1990

[54] CONVEYOR ROLL CONSTRUCTION

[75] Inventors: Jeffery R. Flaugher, Carlton, Mich.; Allan T. Enk, Toledo, Ohio

[73] Assignee: Libbey-Owens-Ford Co., Toledo, Ohio

[21] Appl. No.: 342,592

[22] Filed: Apr. 20, 1989

Related U.S. Application Data

[63] Continuation of Ser. No. 71,859, Jul. 10, 1987, abandoned.

[51] Int. Cl.$^5$ .............................................. B65G 13/02
[52] U.S. Cl. ..................................... 198/780; 65/273; 65/275
[58] Field of Search ............... 198/780, 782, 789, 787; 27/121.1, 121.4, 126, 127, 128, 130; 65/295, 275, 273, 107, 106, 104

[56] References Cited

U.S. PATENT DOCUMENTS

| | | | |
|---|---|---|---|
| 1,447,648 | 3/1923 | Deulin | 198/780 |
| 2,393,471 | 1/1946 | Johnson | 198/780 X |
| 3,126,090 | 3/1964 | Bitzer | 198/837 X |
| 3,485,615 | 12/1969 | Rahrig et al. | 198/780 X |
| 3,485,618 | 12/1969 | Ritter, Jr. | 65/106 X |
| 3,905,794 | 9/1975 | Revells et al. | 65/104 X |
| 3,934,996 | 1/1976 | Frank | 65/104 X |
| 4,140,486 | 2/1979 | Nitschke | 198/780 X |
| 4,167,997 | 9/1979 | Revells | 198/780 X |
| 4,226,608 | 10/1980 | McKelvey | 65/104 X |
| 4,557,745 | 12/1985 | Halberschmidt et al. | 65/106 X |

Primary Examiner—David A. Bucci
Assistant Examiner—Lyle Kimms
Attorney, Agent, or Firm—Marshall & Melhorn

[57] ABSTRACT

A conveyor roll for use in a tempering section of a glass sheet fabrication line includes an elongated inner core member and an outer helical spring member mounted for rotation about said core member. The spring member can be coated with a suitable supporting material or attached to a plurality of collars for supporting and conveying glass sheets.

11 Claims, 3 Drawing Sheets

CONVEYOR ROLL CONSTRUCTION

This application is a continuation of application Ser. No. 07/071,859, filed July 10, 1987, now abandoned.

BACKGROUND OF THE INVENTION

The present invention relates generally to conveyor rolls and, more particularly, to conveyor rolls for moving glass sheets between opposed arrays of cooling fluid directing tubes.

In one known commercial production method for fabricating curved or bent glass sheets in large quantities, such as glazing closures for automobiles and the like, the sheets are supported in a horizontal plane and advanced in a horizontal path on externally driven roll-type conveyors. The sheets are conveyed successively through a heating area, a bending area and a heat treating area for annealing or tempering the bent sheets. The heated glass sheets are advanced from the heating furnace into the bending area and accurately located therein between complemental upper and lower shaping members by the engagement of the leading edges thereof with locating stops positioned in the path of movement of the advancing sheets. When properly oriented, the sheet is engaged along its marginal edge portions by the lower press member and lifted from the conveyor rolls for pressing between the complemental shaping surfaces of the press members into the desired curvature.

It has been found desirable to employ in the bending area a series of conveyor rolls having arcuately shaped central portions which normally are disposed in an upper common horizontal plane for supporting a flat sheet of heat-softened glass prior to bending and which are pivotable into a lower position at angular attitudes or planes relative to the common horizontal plane out of engagement with said flat sheet upon engagement thereof along its marginal edge portion by the shaping rail of the upwardly movable lower press member. In their lower attitudes, these rolls conjointly define a curved surface complementary to the curvature imparted to the sheet for receiving the same after bending and which serve to preserve such curvature as the bent sheet is advanced out of the bending area. These rolls, which are of a two-piece construction comprised of a fixed inner core and a rotatable outer sleeve, are disclosed in detail and claimed in U.S. Pat. Ser. No. 3,905,794.

In the usual roll construction of the above type, the fixed inner core of the roll is attached at one end thereof to a stub shaft extending through axially spaced bushings mounted in a rotatable drive member which is connected to the rotatable sleeve of the roll. During removal and replacement of the curved inner core from and into the outer sleeve, which is required in the bending area each time a production run of differently configured sheets is contemplated, problems were encountered in properly withdrawing and then inserting the associated stub shaft from and through the bushings without damaging the latter. Moreover, even slight wear of these bushings caused erratic and unbalanced rotation of the associated rolls.

U.S. Pat. Ser. No. 4,167,997 discloses a quick connect-disconnect coupling assembly detachably connecting the inner core member of a composite type conveyor roll to its mounting. The coupling assembly includes a tubular drive extension, a first coupling section rigidly secured to the core member and a second coupling section mounted with the drive extension. Such a coupling assembly facilitated rapid and easy conveyor roll core removal and replacement without disturbing other components associated with the roll.

As disclosed in U.S. Pat. Ser. No. 4,167,997, after the bending operation, sheets of glass are transferred through a tempering section where their temperature is rapidly reduced to produce the proper temper in the glass. The tempering section includes a chilling means comprising upper and lower blastheads disposed above and below the path of movement of the glass sheets, each being provided with a plurality of manifold sections having a series of tubes to direct opposed streams of cooling fluid, such as air, toward and against the opposite surfaces of the glass sheets. As the demands for higher quality tempered thin glass and faster production have increased, it has been determined that one method of meeting these demands is to space the cooling tubes closer together. However, the conveyor rolls according to the prior art tend to block a substantial portion of the air flow as the glass sheets move through the tempering section.

SUMMARY OF THE INVENTION

The present invention concerns a conveyor roll for use in moving curved sheets of glass between opposed rows of cooling tubes in a glass tempering section of a production line. The conveyor roll includes a stationary core member with rotatably mounted spaced apart collars linked together by a helical spring member. The spring member is driven in rotation to rotate the collars thereby moving the glass sheets which are supported on the collars through the tempering section. In one embodiment the collars include a cylindrical inner sleeve typically formed of a metal material and attached to the spring member. An outer sleeve of suitable elastomeric material covers the outer surface of the inner sleeve and engages the lower surface of the glass sheets. In another embodiment of the collar, the inner sleeve has an annular groove formed in the outer peripheral surface thereof for retaining an O-ring which provides the supporting surface for the glass sheets. In a third embodiment, the collars are eliminated and the spring member is coated with a suitable supporting material. Since the central core member is stationary, it can be formed with an oval cross section having its longer axis parallel to the longitudinal axes of the cooling tubes in order to reduce the blockage of the air being directed on the glass sheets.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENTS

Figure 1:
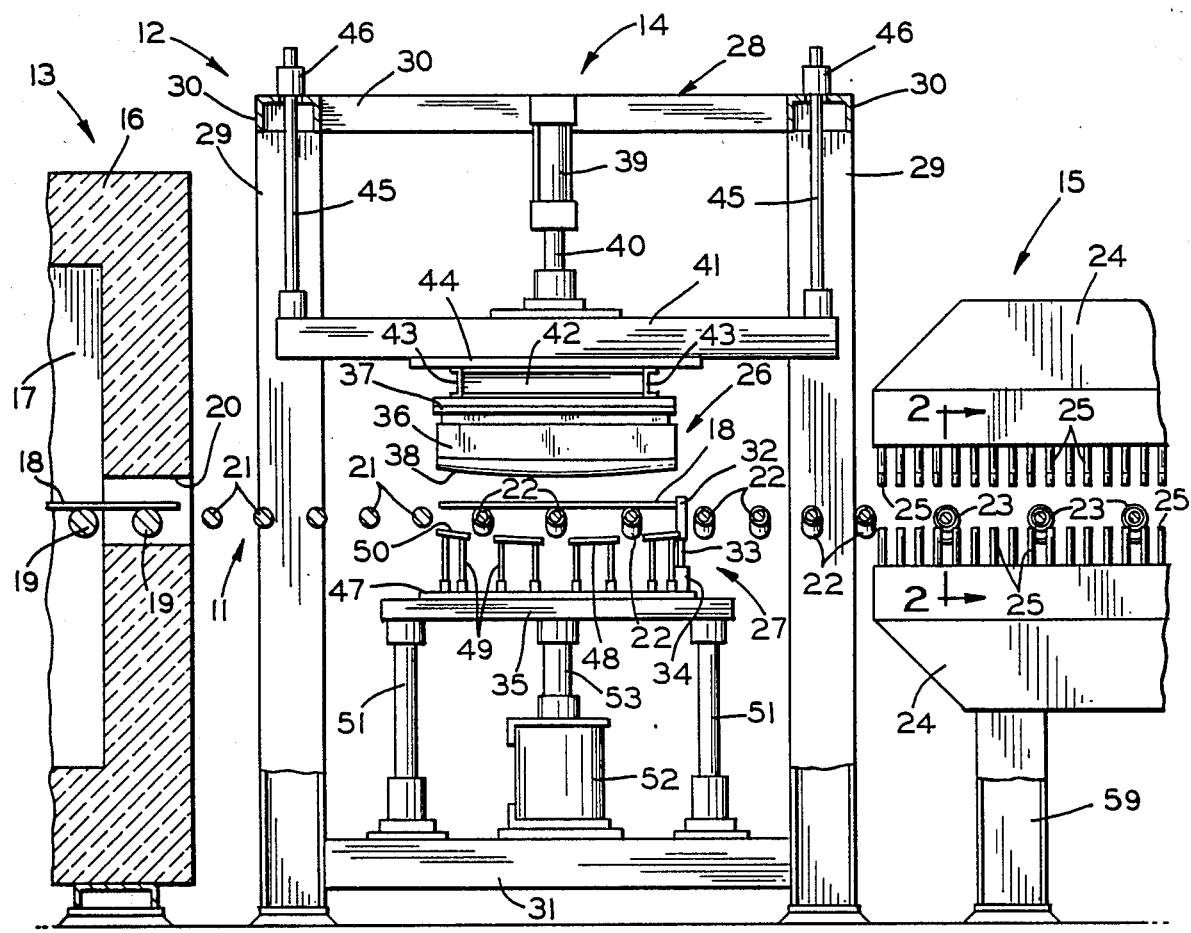
FIG. 1 is a side elevational view of a glass heating section, a bending apparatus and a tempering section of a glass sheet production line, the tempering section being provided with a conveyor roll system incorporating the present invention.

There is shown in FIG. 1 a glass sheet supporting and conveying system 11 which includes conveyor rolls made in accordance with the present invention. The conveyor system 11 forms a component part of a bending and tempering apparatus, generally designated 12, particularly adapted for use in the production of bent, tempered glass sheets by a continuous process. The sheets to be treated are supported and moved successively on a predetermined horizontal path on the conveyor system 11 through a heating section 13, a bending section 14, and a tempering section 15, the sections being contiguous so that a sheet passes immediately from one section to the next succeeding section.

The heating section 13 includes a tunnel-type furnace 16 having a heating chamber 17 defined within the outer walls of the furnace. Sheets of glass 18 are advanced through the heating chamber 17 on a series of conveyor rolls 19, which form a part of the conveyor system 11 and extend from the entrance end (not shown) of the furnace 16, through the oppositely disposed exit end and toward the bending section 14. The sheets 18 are heated to substantially the softening point of the glass during their passage through the chamber 17 and, upon emerging from an opening 20 in the rear end wall of the furnace 16, are received on a second series of conveyor rolls 21 and 22 which form a part of the supporting and conveyor apparatus 11. The sheets are moved within the bending section 14 between a pair of press members, hereinafter more fully described, for imparting the desired curvature to the sheets 18.

After bending, the sheets 18 are advanced along the path and are transferred from the conveyor rolls 22 onto a third set of conveyor rolls 23, forming a part of the conveyor system 11. The rolls 23 move the bent sheets 18 to and through the tempering section 15 wherein their temperature is rapidly reduced to produce the proper temper in the glass. In the embodiment illustrated in FIG. 1, the tempering section 15 includes a chilling means comprising upper and lower blastheads 24 disposed above and below the path of movement of the glass sheets, each being provided with a plurality of tubes 25 operable to direct opposed streams of cooling fluid, such as air, toward and against the opposite surfaces of the sheets 18 moving along such path.

The bending apparatus within section 14 comprises an upper male press member 26 and a lower female press member 27 having opposed complemental shaping surfaces conforming to the desired curvature of the sheet to be bent. The press members 26 and 27 are mounted for relative movement toward and away from each other on a structural frame 28, which includes a framework of vertically disposed columns 29 and horizontally extending beams 30 interconnected and tied together to form a rigid, box-like structure. A base member 31 extends between the upright columns 29 for supporting the female press member 27 and associated parts. The male press member 26 is mounted above the conveyor rolls 22 for vertical reciprocal movement relative to the frame 28 while the female press member 27 is located below the conveyor rolls 22 and mounted for vertical reciprocal movement toward and away from the male press member 26.

A pair of laterally spaced locator stops 32 (only one of which is shown) are positioned in the path of movement of the advancing glass sheets 18 to accurately position the same in the desired location relative to the press members 26 and 27. Each stop 32 is secured to the distal end of a piston rod 33 of a fluid actuating cylinder 34 mounted on a carriage 35. The cylinders 34 are operative to raise and lower the stops 32 between an upper position above conveyor rolls 22 in the path of movement of the glass sheet 18 and a lower position therebeneath.

The male press member 26 comprises a substantially solid body 36 formed of a suitable refractory material capable of withstanding the elevated temperatures to which the mold is subjected. The mold body 36 is suitably mounted on a base plate 37 and is provided with a downwardly directed, generally convex shaping surface 38 to impart the desired curvature to the sheet of glass. However, the specific curvature of the shaping surface 38 is dictated by the desired shape of the glass sheet being bent and can vary widely, as desired. Also, a conventional male press member of outline or ring-type construction having a shaping rail may be used in lieu of the solid-line press member 26, if desired.

The means for supporting the male press member 26 on the frame 28 include at least one actuating cylinder 39 mounted on one of the upper horizontal beams 30 and having a suitable reciprocable piston (not shown) provided with a piston rod 40 connected at its outer end to a vertically reciprocal platen frame 41. The base member 37 of the male press member 26 is connected to the platen frame 41 for movement therewith by means of interconnected structural members 42 and 43 and a support plate 44 extending transversely of the platen frame 41. A plurality of guideposts 45 are connected at their lower ends to the four corners of the platen frame 41 and extend upwardly through suitable bushings 46 mounted on the upper horizontal beams 30 for sliding movement relative thereto to properly guide the platen frame 41 during its vertical reciprocal movement.

The female press member 27 is of outline or ring-type construction and comprises a base member 47 secured to the carriage 35 and a shaping rail 48 connected to the base member 47 in spaced relation thereto by means of a series of connecting rods 49. The shaping rail 48 conforms in outline to the glass sheet 18 to be bent and is provided on its upper face with a generally concave shaping surface 50 complementary to the male press member shaping surface 38 in opposed relation thereto. To permit displacement of the female shaping rail 48 above the level of the conveyor rolls 22 for lifting the sheets thereabove into pressing engagement with the male shaping surface 38, the female shaping rail 48 is formed of a plurality of segments.

The carriage 35 is supported by a plurality of guide members 51 and is vertically movable by a fluid actuator 52 mounted on the base member 31 and having a suitable piston rod 53 for raising and lowering the female press member 27. After bending, the piston rod 53 is retracted to lower the female press member 27 below the conveyor rolls 22, depositing the bent sheet thereon for advancement into the tempering section on the conveyor rolls 23.

Figure 2:
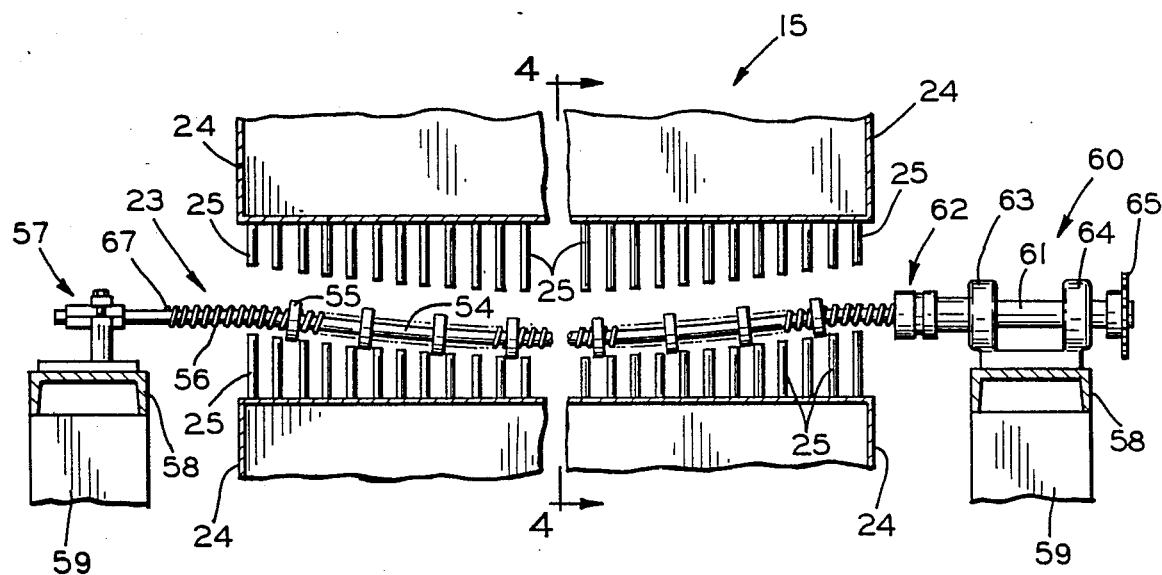
FIG. 2 is a vertical sectional view, on an enlarged scale, taken along the line 2—2 of FIG. 1, showing details of the conveyor rolls made in accordance with the present invention.

As shown in FIG. 2, each of the conveyor rolls 23 includes a flexible, substantially stationary inner core member 54 and outer, load carrying rotatable collars 55 linked together by a helical spring member 56. The core member 54 is bent to follow the desired contour for the glass sheets 18 and similarly, the lengths of the tubes 25 correspond to the desired contour of the glass 18 also. The spring member 56 is flexible for conforming to the arcuate shape of the core member 54, but it also is capable of transmitting torque without significant axial twist or distortion. One end of the conveyor roll 23 is maintained in a support assembly 57 which is described in greater detail in U.S. Pat. Ser. No. 4,670,036 which is assigned to the same assignee as the present application. The support assembly 57 is mounted on the top of a horizontally extending beam 58 supported at spaced intervals by a plurality of columns 59. At the opposite end of each of the conveyor rolls 23, there is connected a drive assembly 60 which is mounted on a similar beam 58 and supporting column 59. The drive assembly 60 is shown and discussed in more detail in U.S. Pat. Ser. No. 4,167,997 owned by the assignee of the present application.

Figure 3:
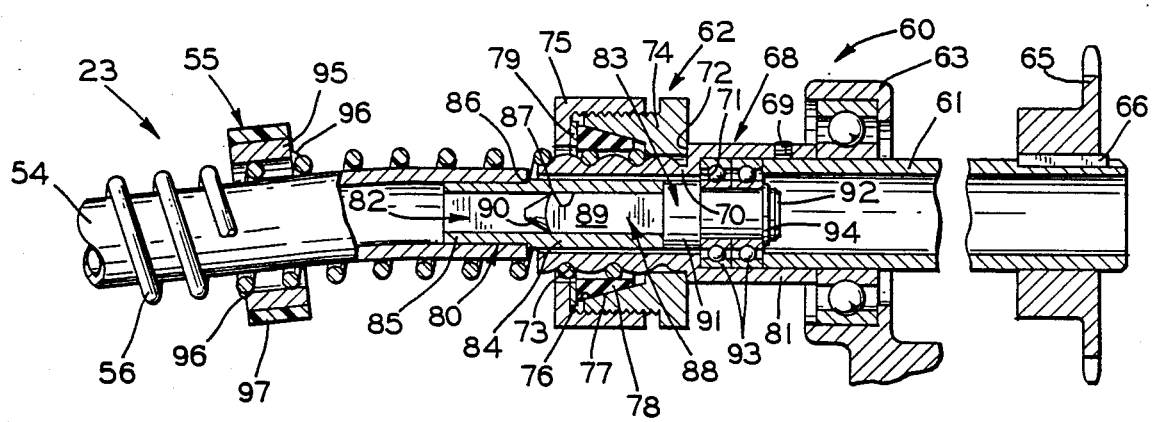
FIG. 3 is an enlarged view in partial section of the drive end of the conveyor roll shown in FIG. 2.

As best shown in FIG. 3, one end of the spring member 56 of each of the conveyor rolls 23 is coupled to a rotatable tubular drive member 61 for rotation therewith by a coupling 62. The drive member 61 is journalled for rotation in spaced bearings 63 and 64 carried on the beam 58 extending along one side of the bending apparatus and is provided with a pinion 65 rigidly secured to the drive member 61 by means of a key 66. An endless drive chain (not shown) is trained about the pinions of the various conveyor rolls for rotating the same in unison at the same rate of speed about their respective chordal axes. The opposite end of the spring 56 is left free, as shown at 67 in FIG. 2 for free rotation relative to the associated core member 54.

Each coupling 62 is mounted on a tubular drive extension 68, which forms a part of a coupling assembly of this invention as will hereinafter be more fully explained, and which is secured to the drive member 61 by suitable set screws 69 for rotation therewith. The tubular drive extension 68 is formed with a reduced diameter portion 70 defining inner and outer annular shoulders 71 and 72. The outer surface of the reduced diameter portion 70 is convoluted, as at 73, to receive the complementary shaped end portion of the spring 56. The coupling 62 also includes an externally threaded male member 74 seated against the shoulder 72 and adapted to receive an internally threaded female connector member 75 disposed about the sleeve member 56 for attaching the latter to the tubular extension 68.

The internal wall surface 76 of the male member 74 is tapered inwardly to engage the outer, conically shaped complemental surface 77 of a gripping sleeve 78 having a bore for receiving the spring member 56 therethrough. The gripping sleeve 78 is formed of rubber or any other suitable resiliently yieldable, elastomeric material and when compressed radially, exerts a radial clamping force on the spring member 56. The rear end of the gripping sleeve 78 is flat and bears against a washer 79 interposed between the gripping sleeve 78 and the rear end wall of the female connector member 75.

Each time a production run of differently configured glass sheets is contemplated, a corresponding change in the curvature of conveyor rolls 23 is required. However, rather than replace the entire composite roll, it is only necessary to replace the core of the roll with its differently curved core since the flexible spring member will assume the overall shape of the core.

In replacing a core member, the customary procedure is to uncouple the idle end thereof from the support assembly 57 and to disconnect the other end from the drive assembly 60 so that the core member can be withdrawn axially from within its associated spring member. To facilitate conveyor roll core removal and replacement, each core member 54 adjacent the drive end of the conveyor roll 23 is provided with a quick connect-disconnect coupling assembly, generally designated 80. The other end of each core member 54 can be detachably connected to the support assembly 57 by a coupling which is disclosed in U.S. Pat. Ser. No. 4,167,997.

The coupling assembly 80 includes a tubular drive extension 81 which serves as a casing or housing for a composite two-piece assembly including a first coupling section 82 secured to one end of each inner core member 54 and a second coupling section 83 mounted within the tubular drive extension 81 which rotates relative to the coupling section 83. The coupling section 82 comprises a cylindrical body 84 having a reduced diameter portion 85 separated by an annular shoulder 86. The reduced diameter portion 85 is press fitted or otherwise fixedly secured within the bore of the core member 54 with shoulder 86 abutting against the end face of the core member. The coupling section 82 is provided with a socket in the form of a bore 87 of square or flat sided configuration extending therethrough for receiving a complementary shaped male member of the other section 83.

The coupling section 83 comprises an elongated body 88 mounted in the tubular drive extension 81 and includes a flat sided lug 89 of substantially square cross sectional configuration adapted to fit into the complementary shaped socket or bore 87 of the coupling section 82. The forward end of the lug 89 is tapered, as shown at 90, to facilitate insertion thereof into the socket 87. The body 88 is provided with a cylindrical flange 91 having the same outside dimension as the cylindrical body 88 of the coupling section 82 and adapted to abut against the end face thereof when the lug 89 is fully inserted into the bore 87.

The rearward end of the elongated body 88 is reduced in diameter, as shown at 92, for receiving a pair of abutting bearings 93 thereon to permit rotary movement of the tubular drive extension 81 relative to the coupling section 83. A suitable retaining ring 94 disposed about the reduced diameter portion 92 holds the bearings 93 in place in an abutting relation against the flange 91. The bearings are also fixed in position between the annular shoulder 86 and the end face of the drive member 61.

Figure 4:
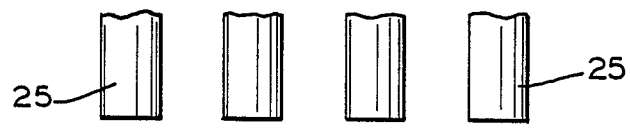
FIG. 4 is a vertical sectional view, on an enlarged scale, taken along the line 4—4 in FIG. 2.
Figure 4:
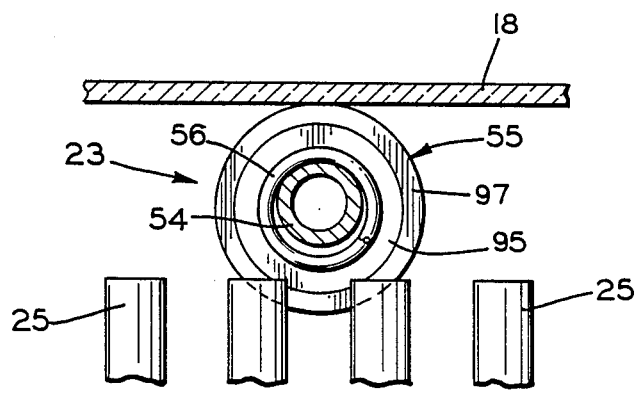

As shown in FIGS. 3 and 4, the collar 55 includes a cylindrical inner sleeve 95 typically formed of a metal material and having an inner diameter approximately equal to the outer diameter of the spring member 56. The inner sleeve 95 can be attached at a desired location on the spring member 56 by any suitable means such as by welding 96. An outer sleeve 97, made of a suitable elastomeric material such as RTV, covers the outer surface of the inner sleeve 95 for engagement with a lower surface of the glass sheets 18. The outer sleeve 97 can be attached to the inner sleeve 95 by any suitable means such as adhesive, press fitting, and molding.

Figure 5:
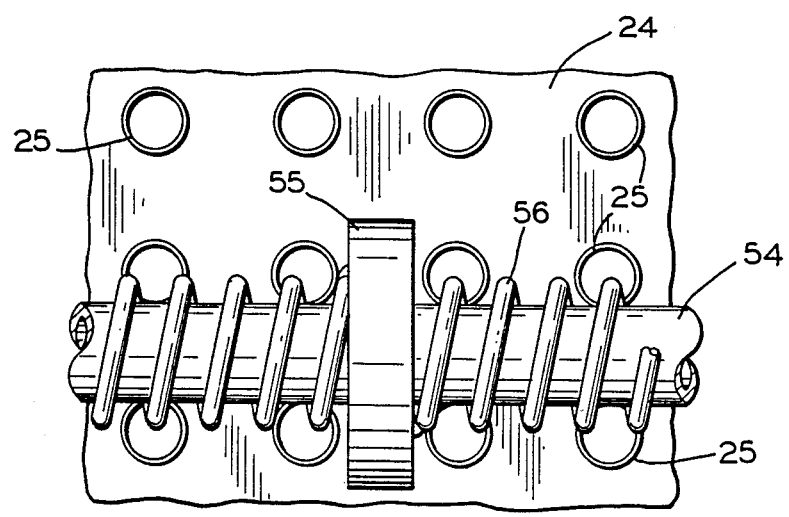
FIG. 5 is a fragmentary top plan view, on an enlarged scale, showing one of the conveyor rolls and the lower set of fluid directing tubes shown in FIG. 1.

As shown in FIG. 5, the tubes 25 are spaced at regular intervals on the blastheads 24. The outside diameter of the core member 54 is approximately equal to the distance between adjacent rows of the tubes 25 so as to minimize the blockage of fluid from the lower ones of the tubes 25. The spring member 56 also reduces the blockage of fluid from the tubes 25 due to its open construction and the collars 55 are positioned between longitudinal rows of the tubes 25 so as not to block fluid flow.

Figure 6:
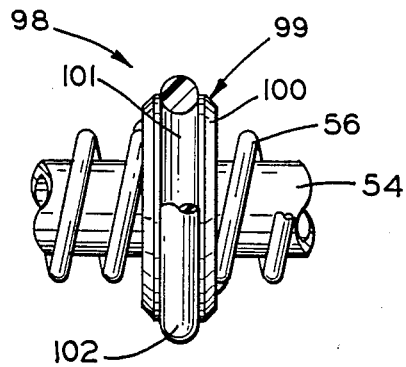
FIG. 6 is a fragmentary front elevational view of a portion of a conveyor roll in accordance with an alternate embodiment of the present invention.

There is shown in FIG. 6 a first alternate embodiment of the conveyor roll 23. A conveyor roll 98 includes the core member 54 and the spring member 56. However, the previously disclosed collars 55 have been replaced by collars 99 each having an inner sleeve 100 with an annular groove 101 formed in the outer peripheral surface thereof. An O-ring 102 is retained by the groove 101 and extends beyond the periphery of the sleeve 100 to provide a supporting surface for the glass sheets 18. The O-ring 101 can be formed of an elastomeric material suitably resistant to heat estimated to be in the range of 600° F.

Figure 7:
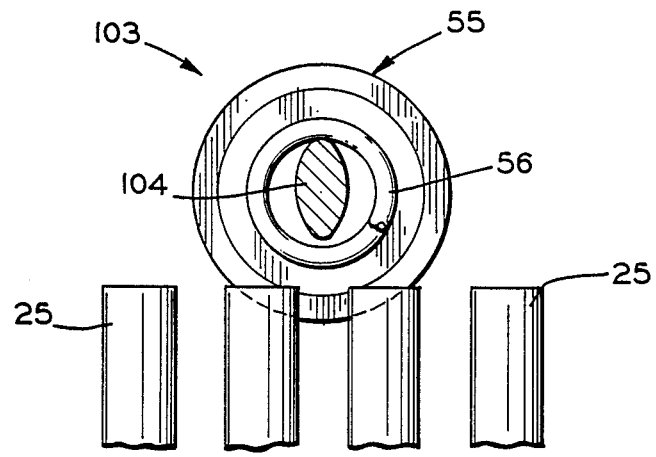
FIG. 7 is a fragmentary side elevational view of a conveyor roll made in accordance with a second alternate embodiment of the present invention.

There is shown in FIG. 7 a second alternate embodiment 103 of the conveyor roll 23. This embodiment can utilize the collar 55 and spring member 56 shown in FIGS. 3 through 5, or the collar 99 shown in FIG. 6 can be utilized. However, the hollow core member 54 has been replaced by a solid core member 104 having an oval shape with the longer axis parallel to the longitudinal axes of the tubes 25. Thus, the cross-sectional area of the solid core member 104 presented to the fluid flow from the tubes 25 is reduced from the cross-sectional area presented by the core member 54 which permits closer spacing of the tubes 25 for increased fluid flow against the lower surface of the glass sheets 18. In this connection, while shown as a solid member, the core 104 could be a flattened or shaped hollow member as well.

Figure 8:
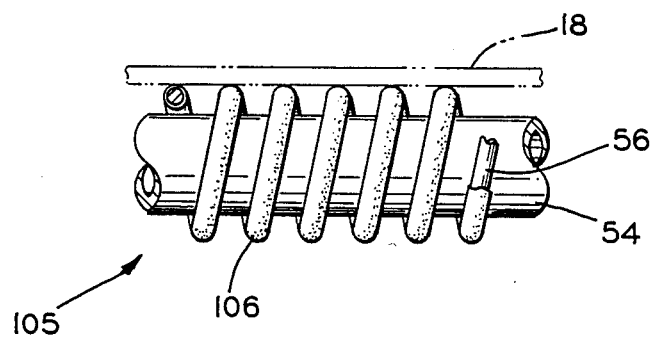
FIG. 8 is a fragmentary front elevational view of a conveyor roll made in accordance with a third alternate embodiment of the present invention.

A third alternate embodiment 105 of the conveyor roll 23 is shown in FIG. 8. The spring member 56 can be utilized with the core member 54 or the alternate embodiment core member 104 of FIG. 7. The collars have been replaced by a coating 106 on the coils of the spring member 56. The coating 106 can be either a spray applied coating, eg., flocked, or a preformed sleeve fitted over the spring wire before coiling in the spring manufacturing process. The coating must be of a suitable heat resistant material which is soft enough not to mark the surface of the glass sheets 18. A suitable material is sold under U.S. Trademark KEVLAR by the E.I. duPont de Nemours & Co. of Wilmington, Del.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. In an apparatus for supporting and conveying glass sheets including a plurality of conveyor rolls each comprising an elongated inner core member and an outer load supporting member, the outer load supporting member rotating about the inner core member, the improvement wherein:
   the outer load support member having
      an exposed outer helical spring member of open construction surrounding and rotatably mounted on said core member; and
      a plurality of individual collars surrounding and attached to said open helical spring member at spaced locations therealong for co-rotation with said spring member, said spring member being openly exposed between adjacent ones of said spaced collars, whereby said spring member can be driven in rotation with respect to said core member, with said spaced collars supporting and conveying glass sheets and said openly exposed spring member permitting fluid flow therearound between said spaced collars.

2. The apparatus according to claim 1 wherein said core member has a ;hollow circular cross section.

3. The apparatus according to claim 1 wherein each said collar includes a cylindrical inner sleeve attached to said spring member and an outer sleeve attached to an outer surface of said inner sleeve.

4. The apparatus according to claim 3 wherein said inner sleeve is formed of a metal material.

5. The apparatus according to claim 3 wherein said outer sleeve is formed of an elastomeric material.

6. The apparatus according to claim 1 wherein said core member has an oval cross section.

7. In an apparatus for supporting and conveying glass sheets including a plurality of conveyor rolls each comprising an elongated inner core member and an outer load supporting member, the outer load supporting member rotating about the inner core member, the improvement wherein:
   the outer load support member having
      an exposed outer helical spring member of open construction extending about and rotatably mounted on said core member; and
      a plurality of collars at spaced intervals along said helical spring, each said collar having a sleeve attached to said spring member whereby said spring member and said collar can be driven in rotation with respect to said core member to support and convey glass sheets on said collars, said openly exposed spring member permitting fluid flow therearound between said spaced collars.

8. The apparatus according to claim 7 wherein said sleeve is an inner sleeve and said collar has an outer sleeve formed of an elastomeric material and attached to an outer surface of said inner sleeve.

9. In an apparatus for supporting and conveying glass sheets including a plurality of conveyor rolls each comprising an elongated inner core member and an outer load supporting member, the outer load supporting member rotating about the inner core member, the improvement wherein:
   the outer load support member having
      an exposed outer helical spring member of an open cosntruciton extending about and rotatably mounted on said core member; and
      a plurality of collars attached to said spring member at spaced intervals therealong for co-rotation therewith, said spring member being visibly exposed between said spaced collars, whereby said spring member can be driven in rotation with respect to said core member and said collars support and convey glass sheets, said openly exposed spring member permitting fluid flow therearound between said spaced collars.

10. In an apparatus for supporting and conveying glass sheets including a plurality of conveyor rolls each comprising an elongated inner core member and an outer load supporting member, the outer load supporting member rotating about the inner core member, the improvement wherein:

the outer load support member having
an outer helical spring member extending about and rotatably mounted on said core member whereby said spring member can be driven in rotation with respect to said core member to support and convey glass sheets;
at least one collar having a central aperture formed therein through which said core member and said spring member extend, said collar being attached to said spring member for co-rotation therewith; and
said collar including a sleeve having an annular groove formed in an outer peripheral surface thereof and an O-ring retained in said groove and extending beyond the periphery of the sleeve.

11. In an apparatus for supporting and conveying glass sheets including a plurality of conveyor rolls each comprising an elongated inner core member and an outer load supporting member, the outer load supporting member rotating about the inner core member, the improvement wherein:

the outer load support member having
an outer helical spring member extending about and rotatably mounted on said core member;
at least one collar having a sleeve attached to said spring member whereby said spring member and said collar can be driven in rotation with respect to said core member to support and convey glass sheets on said collar; and
said sleeve having an annular groove formed in a peripheral surface thereof and said collar including an O-ring retained in said groove and extending beyond said peripheral surface.

* * * * *